(12) United States Patent
Schuler

(10) Patent No.: US 8,307,068 B2
(45) Date of Patent: Nov. 6, 2012

(54) SUPERVISED ACCESS COMPUTER NETWORK ROUTER

(75) Inventor: John A. Schuler, Chandler, AZ (US)

(73) Assignee: Volonics Corporation, Gilbert, AZ (US)

( * ) Notice: Subject to any disclaimer, the term of this patent is extended or adjusted under 35 U.S.C. 154(b) by 136 days.

(21) Appl. No.: 12/486,736

(22) Filed: Jun. 17, 2009

(65) Prior Publication Data

US 2010/0325259 A1    Dec. 23, 2010

(51) Int. Cl.
*G06F 15/173* (2006.01)
*G06F 15/16* (2006.01)
*G06F 15/177* (2006.01)
*G06F 3/048* (2006.01)

(52) U.S. Cl. ........ 709/224; 709/223; 709/225; 715/867; 715/736; 726/11; 726/12

(58) Field of Classification Search .......... 709/223–225; 715/867, 736; 726/11, 12
See application file for complete search history.

(56) References Cited

U.S. PATENT DOCUMENTS

| | | | | |
|---|---|---|---|---|
| 5,835,722 | A * | 11/1998 | Bradshaw et al. | 709/225 |
| 5,987,611 | A | 11/1999 | Freund | |
| 6,023,507 | A | 2/2000 | Wookey | |
| 6,065,056 | A * | 5/2000 | Bradshaw et al. | 709/229 |
| 6,446,119 | B1 * | 9/2002 | Olah et al. | 709/224 |
| 6,745,367 | B1 * | 6/2004 | Bates et al. | 715/205 |
| 6,795,856 | B1 | 9/2004 | Bunch | |
| 6,978,303 | B1 | 12/2005 | McCreesh | |
| 7,249,187 | B2 | 7/2007 | Sobel | |
| 7,253,732 | B2 * | 8/2007 | Osann, Jr. | 340/541 |
| 7,315,891 | B2 * | 1/2008 | Donahue | 709/224 |
| 7,640,336 | B1 * | 12/2009 | Lu et al. | 709/224 |
| 7,707,284 | B2 * | 4/2010 | Friedman et al. | 709/224 |
| 2001/0027412 | A1 * | 10/2001 | Son | 705/14 |
| 2001/0049701 | A1 * | 12/2001 | Howerton, III et al. | 707/513 |
| 2002/0071031 | A1 * | 6/2002 | Lord et al. | 348/143 |
| 2004/0155910 | A1 * | 8/2004 | Chang et al. | 345/904 |

(Continued)

FOREIGN PATENT DOCUMENTS

GB    2466033 A  *  6/2010

OTHER PUBLICATIONS

The Early Report—The Early Show segment, "Big Brother in the Corner Office," Julie Chen, cbsnews.com/earlyshow/caught/techage/20001228e_sniff.shtml, Dec. 28, 2000:Tech Age. pp. 1-2.*

(Continued)

*Primary Examiner* — Gregory Todd

(57) ABSTRACT

A system for monitoring and regulating computer usage on a local network is disclosed. Computers on a network are configured with a client activity monitoring module that collects activity information including screen captures, keyboard activity, and/or information relating to network communications and sends the collected activity information to a network activity monitor for storage and later retrieval. Each computer on the local network periodically verifies that its client activity monitor module is operable. If a computer fails to send such verification, the system restricts network access by that computer, thus enforcing compliance with the activity monitoring system. The system further provides means for automatically displaying the collected activity information, including through screen savers, automatically changing desktop background images, and pop-up or sidebar windows. The system thus enables review of computer activities for appropriateness by both supervisors or parents as well as by peer users without requiring the reviewer to take affirmative steps to retrieve the activity information.

15 Claims, 4 Drawing Sheets

U.S. PATENT DOCUMENTS

| | | | |
|---|---|---|---|
| 2005/0144297 A1* | 6/2005 | Dahlstrom et al. | 709/229 |
| 2007/0028176 A1* | 2/2007 | Perdomo et al. | 715/741 |
| 2007/0130148 A1 | 6/2007 | Wu | |
| 2008/0133747 A1* | 6/2008 | Fish | 709/224 |
| 2008/0281940 A1* | 11/2008 | Coxhill | 709/217 |
| 2008/0306794 A1* | 12/2008 | Cohen et al. | 705/7 |
| 2010/0162183 A1* | 6/2010 | Crolley | 715/867 |
| 2010/0211639 A1* | 8/2010 | Shi | 709/206 |

OTHER PUBLICATIONS

Vericept, esniff.com, http://web.archive.org/web/20010411000349/www.esniff.com/home.html, Apr. 11, 2001, pp. 1-7.*

* cited by examiner

SUPERVISED ACCESS COMPUTER NETWORK ROUTER

BACKGROUND OF THE INVENTION

1. Field of the Invention

This invention relates to computer networks and methods of monitoring usage and regulating access to network resources. More particularly, the invention relates to a system and method for monitoring computer usage by computers connected to a local network and restricting network access to any computer that fails to verify its compliance with the computer monitoring system of the invention. Computer usage is monitored by a client program operating on each client computer that collects activity information including screen captures, keyboard activity, and/or selected network traffic. The activity information is aggregated on a server that provides the information to each client computer for automatic display through display means including screen savers, automatically changing desktop background images, and popup or sidebar windows. The automatic display feature enables peer review as well as review by parents or other supervisory personnel. User-initiated review of activity information is also permitted.

2. Description of Related Art

The continuing proliferation of increasingly inexpensive portable computers capable of wired or wireless network access has aggravated the problems of monitoring computer usage and regulating network access on home and workplace computer networks. These problems may be in the form of minors using either portable or desktop computers to access pornography or gambling web sites. The problems may also arise in a workplace environment where employees may use computers and networks intended for business use to access inappropriate or unauthorized materials when the employees are expected to be performing their work duties.

A variety of solutions have been developed in previous attempts to solve these problems. One technique is to block access to a predefined list of web sites, often referred to as network filtering. Access to web sites can be blocked based on matching complete web site addresses or partial addresses. This simple blocking technique has been implemented in software that must be installed on each computer the supervisor intends to monitor. Such software-only implementations are easily circumvented by removing or disabling the filtering software, or by booting the computer to a different operating system using either a portable disk drive or a CD-ROM. In addition, these software-only solutions do not monitor or regulate access by non-approved computers temporarily connected to a network. These non-approved computers may include a notebook computer without such filtering software that is brought into a home or workplace and either plugged into a wired network or connected to a wireless access point. Internet filtering has also been implemented in hardware devices such as wireless network routers. The network router-based filtering solution has the advantage that it filters all traffic on the network, and thus filters network access by all computers whether or not client monitoring software is installed and operating. Network filtering is inherently an imperfect technique, however implemented, because the list of blocked web sites must be frequently updated, requiring either extensive time updating the list by the supervisor or a paid subscription and reliance on an outside source for the list. Due to the imperfect nature of filtering, parents and other supervisors must still maintain some monitoring procedure to detect users' access to inappropriate material that was not blocked by the filter. In addition, filtering is readily circumvented using proxy servers and VPN connections, both of which may be easily discovered by users using ordinary Internet search methods. A further problem with filtering is that there will often be an imperfect match between what a third party filtering provider deems inappropriate and what a parent or supervisor might consider to be inappropriate.

Another solution to the problems of monitoring and regulating computer network usage is that of computer activity monitoring software. Conventional examples are marketed to parents seeking a solution to effectively monitor their children's computer network usage. These products include features such as tracking all web pages visited and generating reports of time spent online as well as web sites visited. Additional features of these programs include collecting all chat and instant message activity on the computer for later review by parents and collecting screen capture images for later review of what material was displayed on the computer screen at various times. These products all require the parents to take affirmative and time consuming steps to review the collected computer activity data.

Another alternative approach available to parents is the kid-safe browser. These products, such as KidRocket (www.kidrocket.org) and Kidzui (www.kidzui.com), lock a computer into a kid-safe web browser and require a password to exit the program. Within the program, only pre-screened web pages that are deemed safe for children are allowed to be accessed. In addition to allowing access to only approved content, these products also allow parents to receive regular reports on what materials are being accessed by their children. Programs of this type do allow for automatic email updates about children's computer activity, but the email delivery mechanism limits the volume of graphical information that can be presented to parents and still requires the manual step by the parents of accessing the email account that receives the activity reports.

In view of the foregoing, there is a need in the art for a computer network security system capable of monitoring computer activity on a network and restricting network activity by unmonitored computers. A further need exists for such a system implemented in a physical device such as a switch or router that can restrict network access by all computers on a network. There is also a need for timely, automatic presentation of computer activity information to both supervisors and peers in order to ensure prompt review without waiting for affirmative steps by the supervisor and also to maximize the deterrent effect on the monitored users.

BRIEF SUMMARY OF THE INVENTION

The present invention overcomes the problems associated with the prior art by providing a system for collecting computer activity information across a computer network. The present invention improves on existing approaches by providing a system that: (1) continuously monitors client computers for correct operation of client monitoring software; (2) allows full network access only to those client computers that verify their correct operation of the client monitoring software; and (3) obtains from each client computer data relating to user activity on the client computer including images periodically captured from the client computer display. The system displays the collected activity information on both supervisor and peer computers through automatic display means such as screen savers, automatically changing desktop background images, and pop-up or sidebar windows. The automatic display means employed by the present invention contrast with the user initiated display means employed by prior art computer monitoring systems. Prior art systems employ a variety of user-initiated review mechanisms, but in general the parent or supervisor must log into a secure program or web site and call up activity information by user, date, or time. The automatic display means of the present invention enable supervisor or peer review of activity information without any action to initiate review of the stored activity information— the information is simply presented through a computer's screen saver when the computer is not in use and optionally also while the computer is in use through automatically changing desktop background images or other popup or sidebar window display means.

By automatically presenting activity information to both supervisors and peers, the system ensures easy, frequent review of computer activities for appropriateness by both peer users and supervisors or parents, thus increasing the deterrent effect on users who know of the monitoring and of the frequent review. The deterrence is magnified because the images showing user activity have superimposed on them the date and time of the information capture and the identification of the user whose activity the image shows. The open and obvious peer-review monitoring enabled by the present invention is in contrast to the more secretive methods and systems in the prior art, many of which attempt to catch users unaware that they are being monitored.

DETAILED DESCRIPTION OF THE INVENTION

Overview

Figure 1:
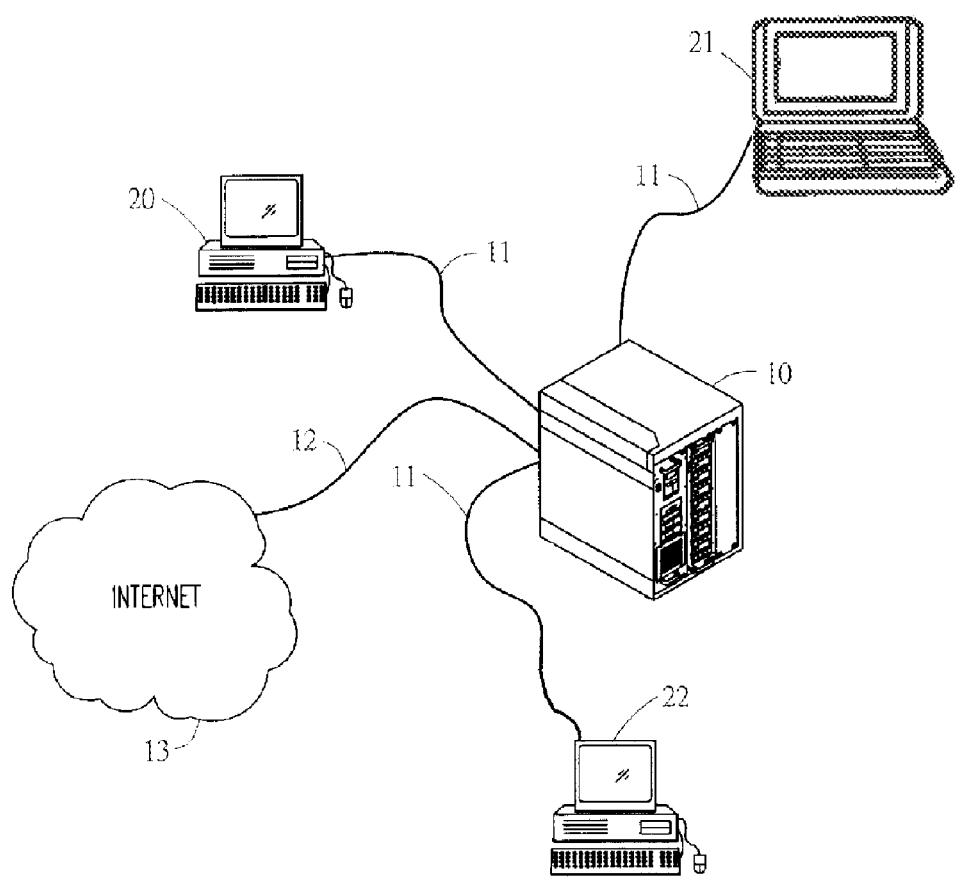
FIG. 1 is an exemplary embodiment of a conventional computer system in which the present invention may be embodied.

FIG. 1 illustrates a computer system incorporating the present invention. A network appliance 10 connects to computers 20, 21, and 22 via a network connection 11. Network appliance 10 further connects computers 20, 21, and 22 to the Internet 13 via an external network connection 12. Network connection 11 may be a computer network link of any commonly available type, whether wired or wireless, including Ethernet and WiFi. Network connection 12 may be a computer network link of any commonly available type. Where the present invention is implemented in a home network environment, network connection 12 would typically be a cable modem link, a DSL modem link, a satellite internet link, or another commonly available link to the Internet. Computers 20, 21, and 22 may be any commonly available computer, including desktop computers, notebooks, netbooks, and smart phones. Because all network traffic between computers 20, 21, and 22 passes through the network appliance 10, network appliance 10 is in an effective position to monitor and regulate access to the Internet 13 by computers 20, 21, and 22.

Network appliance 10 includes a router-switch 83 for selectively allowing, blocking, or otherwise regulating access to the Internet 13 by computers 20, 21, and 22. As used in the discussion below, the term "router-switch" means a network device having a plurality of network ports and a means for controllably passing network traffic from one network port to another. In the preferred embodiment, access to the Internet 13 by computers 20, 21, and 22 is blocked by default. Any attempted connections to the Internet 13 by computers 20, 21, and 22 are intercepted by network appliance 10 and redirected to a web page explaining the monitoring policies and providing a means to download a client activity monitor. Once installed on one of computers 20, 21, and 22, the client activity monitor has two primary functions. First, client activity monitor collects activity information and forwards it to network appliance 10. Second, client activity monitor periodically sends a status message to network appliance 10 confirming that client activity monitor is operating correctly. In addition to a client activity monitor, at least one of computers 20, 21, and 22 includes a network activity display module for displaying activity information provided by network appliance 10 that network appliance 10 collected from each active client activity monitor.

Network Appliance Component

Figure 2:
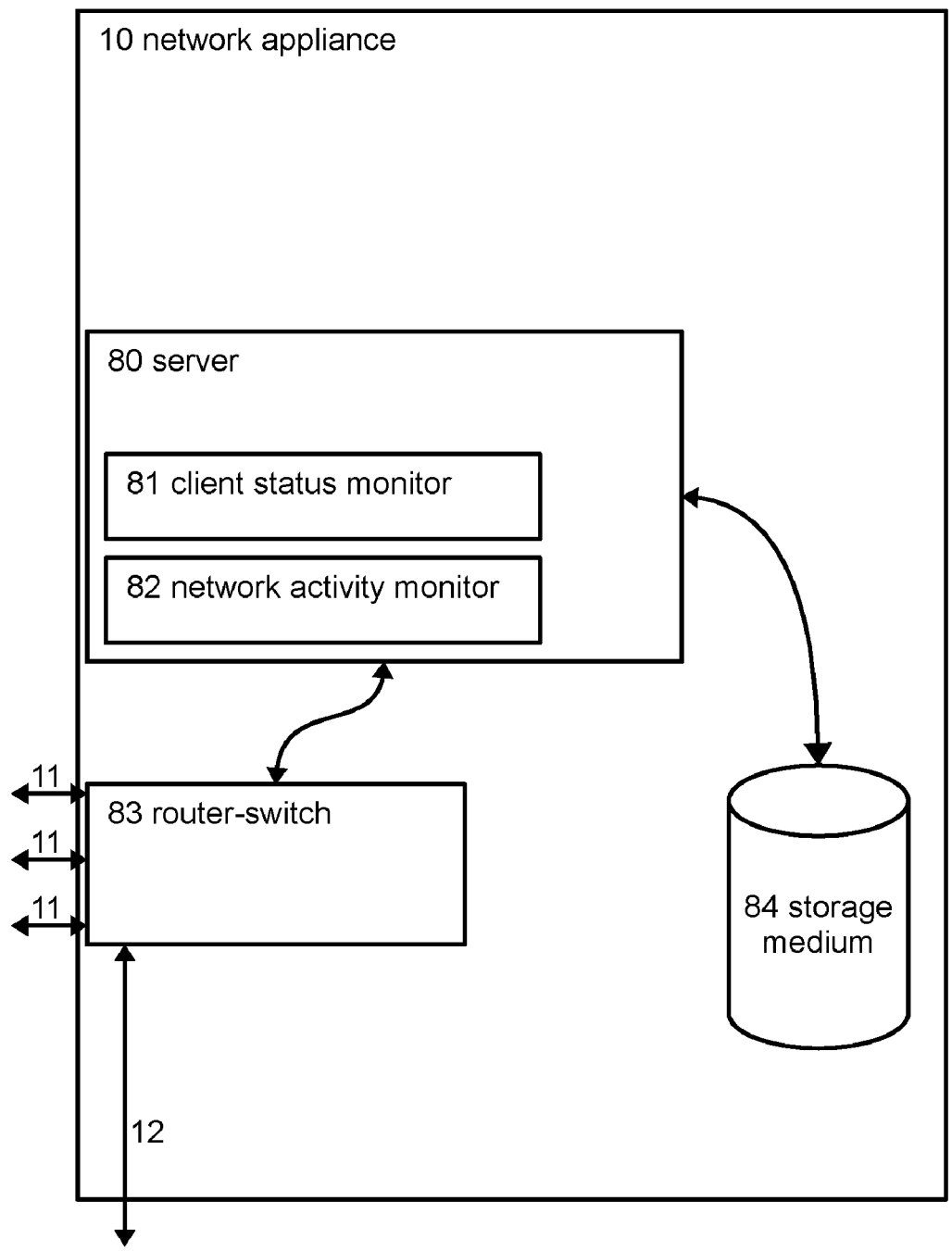
FIG. 2 is a block diagram illustrating an embodiment of the network appliance component.

In the preferred embodiment of the present invention, all elements of the network appliance 10 are enclosed within a locked housing that includes sufficient space to enclose a typical DSL or cable modem used for access to the Internet. The locked housing provides a layer of physical security to the system in that it makes bypassing or tampering with the network appliance 10 more difficult. As shown in FIG. 2, the network appliance 10 comprises a router-switch 83 and a network server 80 including a computer hardware platform with a processor, a computer-readable medium for storing data and program code, and a means for communication to said network router-switch 83, such as through a wired or wireless network connection, serial, USB, or other IO port. The network server requires adequate storage on its computer-readable medium to store its operating system and the program code for the status monitor and network activity monitor. Additional storage 84, used for storing activity information, is preferably internal to the network appliance 10, but may be located anywhere so long as it is accessible by the network server 80 via a network connection. The router-switch 83 may be one of a variety of commonly-available types having a plurality of wired or wireless network ports connected to a local network 11 and one or more network ports connected to a remote network 12 such as the Internet 13. The router-switch 83 need only be capable of being configured by the server 80 through a control port. In the preferred embodiment, the network server and the router-switch 83 are integrated such that the network server 80 controls the router-switch 83 through a bus. In alternative embodiments, the network server may be external to the network appliance 10 and control the router-switch 83 via a network connection or a serial, USB, or other IO port.

In its initial state, the router-switch 83 blocks all network traffic between the local network 11 and the Internet 13. In addition, the network server 80 controls the router-switch 83 to redirect all network traffic originating on the local network 11 to a web page provided by the network server 80. This web page includes text explaining any active network monitoring policies including the requirement for client computers to install and run a client activity monitoring program before being allowed to access the Internet 13. A link is also provided through which the client activity monitoring program may be downloaded from storage 84 connected to the server 80.

The network server 80 is loaded with computer program code embodying the client status monitor 81 and operable to receive status messages from computers 20, 21, 22 on the local network 11. Upon receipt and verification of a 'STATUS OK' message, the client status monitor sends a control message to the router-switch 83 directing it to allow network traffic between the Internet 13 and the computer 20, 21, or 22 that originated the status message. In the preferred embodiment, control of enabling, restricting, and redirecting network traffic between the local network and the Internet is accomplished using iptables routing and forwarding commands, which commands are described in more detail in the netfilter/iptables project documentation at http://www.netfilter.org/. Although iptables is a convenient and preferred means for implementing the network routing aspects of the present invention, a variety of other computer network devices are known in the art to accomplish this underlying functions of connecting, disconnecting, restricting, blocking, or redirecting network traffic. After receiving a 'STATUS OK' message, the client status monitor sets a timer for a preconfigured amount of time, after which network access will again be restricted between the Internet and that individual client if a subsequent 'STATUS OK' message has not been received by the client status monitor 81 from that client.

Figure 4:
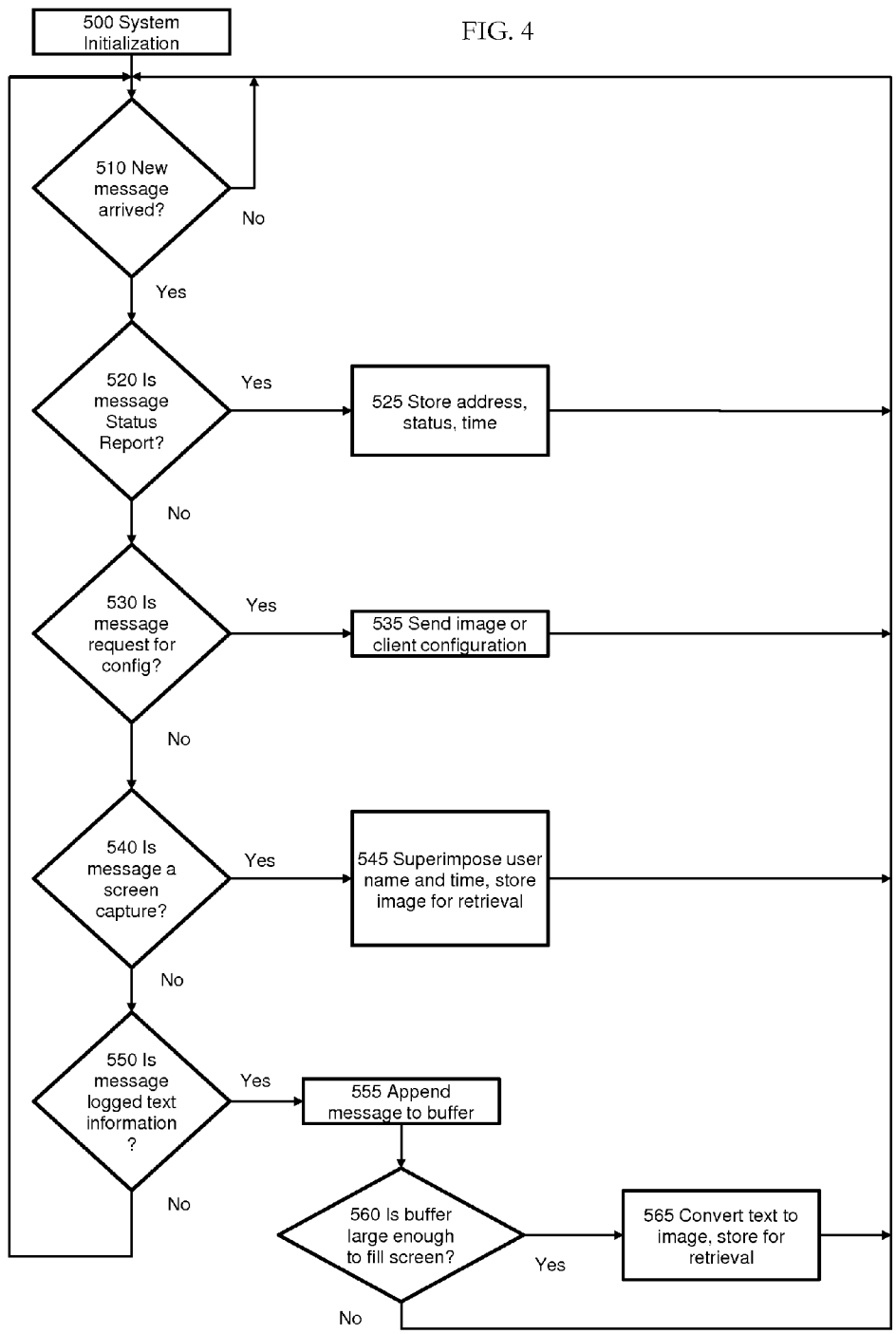
FIG. 4 is a flowchart diagram depicting the operation of an embodiment of the network activity monitor and client status monitor.

The operation of the client status monitor 81 and network activity monitor 82 in the preferred embodiment is set out in greater detail in FIG. 4. Upon powering on the network appliance 10, the step of system initialization 500 includes loading the operating system, initializing network interfaces, and starting the client status monitor 81 and network activity monitor 82 routines. This step of system initialization 500 is typical of computer initialization processes known in the art. The operating system used in the preferred embodiment is IPCOP, which is freely available at www.ipcop.org, but a wide variety of operating system software would be capable of supporting the system of the present invention. At process block 510, the appliance tests to see if a new message has arrived for either the client status monitor 81 or the network activity monitor 82. If a message has arrived, at step 520 the message is tested to see if it is a status report from a computer 20, 21, 22 on the local network 11. If it is a status report, the status monitor 81 updates a status table with the associated IP address, the STATUS OK or STATUS-FAIL message from the status report and the time the status report was received by the network appliance 10. The status table can be a lookup table, database, or any other read-write data storage structure or system. Preferably, it would be indexed by the IP address of the status report for easy retrieval. No more than one record for a given IP address is stored at any one time, thus each new status report from an IP address overwrites the previous stored status report, if any. After storing the status report, processing of the message is complete.

If at step 520 the message is determined not to be a status report, at step 530, the message is tested to see if it is a request for a client activity image or a client configuration file. If it is, at step 535 the network activity monitor 82 obtains a client activity image or the client configuration file from local or network attached storage and sends it to the requesting client. If at step 530 the message is determined not to be a request for a client activity image or the client configuration file, at step 540 the message is tested to see if it is a screen capture. If it is, at step 545 the network activity monitor 82 superimposes onto the image a timestamp and the username associated with the client that sent the screen capture. The image is then stored in local or network attached storage for future retrieval. At step 550, the message is tested to see if it is logged information in text format such as captured keyboard activity. If it is, the logged information is appended to a buffer at step 555. If at step 560 the buffer has reached a size sufficient to adequately fill a screen image, at step 565 it is converted into image format and the resulting image is stored in local or network attached storage for later retrieval.

The network appliance may restrict network access by a client in a variety of ways. The simplest and preferred method is to simply block all network traffic between that client and the Internet. The present invention is not limited to blocking network traffic, however, as other means may also be employed to restrict network access to a degree sufficient to provide the desired incentive for computer users to install the client monitoring software. For example, instead of blocking all network access between a particular client and the Internet, the network appliance could control the router-switch 83 such that 90% of packets associated with that client were dropped or modified in some way. Alternatively, the bandwidth allowed for a particular client could be dramatically restricted such that effective speeds were slower than dialup Internet connections. Regardless of the particular method employed, where reference is made to restricting network access, the present invention includes any method of degrading the speed, reliability or availability of a network connection.

Client Activity Monitor Component

Figure 3:
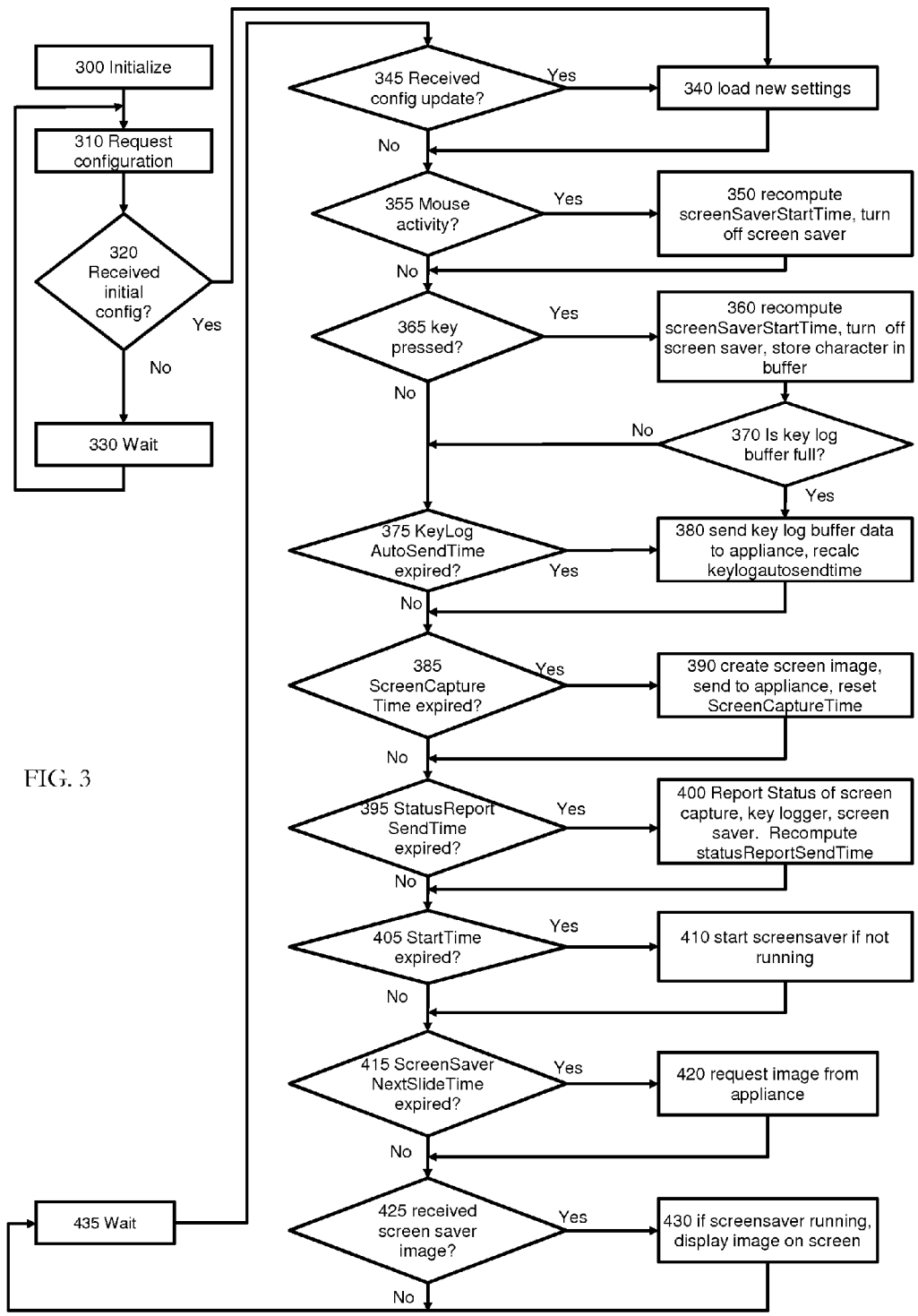
FIG. 3 is a flowchart diagram depicting the operation of an embodiment of the client activity monitor.

FIG. 3 illustrates the operation of the client activity monitor in the form of a flowchart diagram. The client activity monitor is implemented as a software program and has two primary functions: (1) to collect activity information relating to user activity on the computer and transmit it to the network appliance; and (2) to periodically verify its operational integrity and send a 'STATUS OK' message to the network appliance. The user activity information collected by the client activity monitor may include capturing images of the display screen attached to the computer, capturing all keys pressed on the keyboard, and capturing selected network traffic to or from the user's computer. A variety of other sources of activity information are also envisioned, for instance user activity may be monitored by capturing selected data from USB ports, video ports, or any other I/O port. Screen captures are advantageous in that everything the computer user sees on the screen is subject to random capture for later review, and thus it may readily be determined if the user was viewing pornography, visiting gambling web sites, or engaging in other unauthorized or undesirable activity. By also capturing key presses, more thorough monitoring of email, instant message activity, and internet searches is made possible.

The client activity monitor may also be configured to monitor network traffic, selecting certain types of traffic to be captured and stored for later review. For example, the client activity monitor may use pattern matching techniques known in the art to identify all requests for web pages, generally referred to as HTTP requests. Because a computer user may download pornography with the browser window mostly or entirely off-screen or by using command-line tools such as GNU wget, pornography and other inappropriate material may be downloaded to a computer without appearing on the computer screen. In a computer system embodying the present invention, the user activity on a computer may only be monitored while the computer is connected to the network. Accordingly, the ability to monitor more than just what appears on the screen is desirable because material may be acquired through the local network for later use or viewing while disconnected from the network or on a portable media player such as a smart phone or iPod. It should be noted that because the network appliance is the gateway to the Internet, network traffic monitoring need not be implemented in the client activity component—it could be scanned by the network appliance as it is routed to and from each monitored computer.

The second primary function of the client activity monitor is to frequently execute a sequence of self-checks to ensure its operational integrity. These checks would preferably include verification of proper registration of the software components with the operating system, proper operation of the screen capture functionality, and proper operation of the screen saver or other network activity display module functionality. The client activity monitor contains an encryption key that is used to periodically send an encrypted status message to the network appliance. The status message will indicate a message of 'STATUS OK' if all functionality is operating correctly. The encryption key is preferably stored in the client activity monitor in one of several ways known in the art to make it difficult to determine the key by examining the client activity monitor application files. In an alternative embodiment, the activity information collected and sent to the network appliance could itself be used as the status message—the transmittal of each message containing activity information could be deemed to have an implicit 'STATUS OK' message.

Referring now to FIG. 3, the operation of the preferred embodiment of the client activity monitor component of the present invention is set forth in detail. The system initialization step 300 includes operations typical of conventional computer systems such as powering the system components on, loading the operating system and drivers, and loading the client activity monitor software. At step 310, a request for client configuration data is sent to the network appliance 10. At step 320, the client activity monitor tests to see if the initial configuration data has been received from the network appliance 10. If it has not, a delay period is encountered at step 330 and then the process returns to step 310 to make a new request for the initial configuration. If the initial configuration data was received at step 320, the client activity monitor loads the new settings at step 340.

After the settings are loaded in step 340, the client activity monitor tests at step 355 to see if there has been mouse activity such as a button click or movement of the mouse. If there has been mouse activity, the screen saver operation is stopped if it is running and a new screen saver start timer is initiated at step 350. Next, at step 365, the client activity monitor tests to see if a key has been pressed. If a key has been pressed, at step 360 the screen saver operation is stopped if it is running, a new screen saver start timer is initiated, and the character associated with the key pressed is stored in a buffer. The buffer is then tested to determine if it is full at step 370. If it is, at step 380 the contents of the buffer are sent to the network appliance and a key log send timer is reset. If at step 365, the test determines that no key has been pressed, then at step 375 the key log send timer is checked to see if it has expired. If it has, step 380 is performed as described above. At step 385, the client activity monitor tests to see if the screen capture timer has expired. If it has expired, a snapshot image of the screen is captured and sent to the network appliance 10. The screen capture time is then reset to a value determined by reference to a pseudo-random number generator routine. The randomization of the timer value is done to reduce the ability of a user to predict when a screen capture will be taken and avoid unauthorized activities at moments when a screen capture is anticipated.

The next step is step 395, in which the status report send timer is tested to see if it has expired. If it has, the client activity monitor checks the status of its screen capture component, key logger component, and screen saver component. During normal operation of the client activity monitor, various API and library function calls are made, each of which passes a pass/fail return value. Any call failure is sufficient to trigger sending a STATUS-FAIL message to the network appliance 10. A status report is then sent to the network appliance 10 and the status report send timer is reset. Next, the screen saver start timer is tested at step 405 to see if it has expired. If it has, the screen saver component is started at step 410. In the preferred embodiment, the built-in screen saver on the client computer is disabled and the client activity monitor takes over the screen saver functionality. As with conventional screen savers, the screen saver start timer would typically be set to a value between 5 and 30 minutes, and if no user activity is detected in that amount of time, the screen saver component will start. At the next step, step 415, the screen saver next slide timer is tested to see if it has expired. If it has, in step 420 a request is sent to the network appliance 10 for a new image to display. Next, in step 425, the client activity monitor tests to see if a screen saver image has been received from the network appliance 10, and if it has, in step 430 the image is displayed on screen.

As described above in reference to FIG. 3, in the preferred embodiment, all user activity information that is collected is transmitted to the network appliance for storage. Keyboard activity is buffered either on the client or on the network appliance until enough is captured to fill a screen image, and screen capture images are sent to the network appliance without delay. Although such information could be collected for a period of time on the client computer and transmitted to the network appliance on a less frequent basis, such a configuration would allow opportunities for tampering with the stored data and potentially lead to loss of captured data on a sudden shut-down of the client computer.

Although the preferred embodiment is described in reference to a screen saver display module, the present invention is not limited to this screen saver display configuration. In place of or in addition to the screen saver display module, the advantages of the present invention may also be achieved by using alternative display modules such as pop-up windows, automatically changing desktop background images, and the Windows Vista or Google sidebars. These display means retrieve images for display from the network appliance in the same way as the screen saver component. The primary difference would be that a slideshow sequence of images would constantly appear as the user is using the computer rather than only when the computer is idle. By using one of these means in combination with the screen saver component, the exposure of the activity data is increased. The effectiveness of the present invention relies in significant part on the deterrent effect on the users who know that there is a likelihood that what is on their screen will appear in a slide show and be viewable by other users or by a supervisor or parent. The capability of the present invention to present the activity information to peer users and supervisors in a variety of ways without requiring a manual step of calling up the information enhances its effectiveness. Of course, as with prior art computer monitoring systems, the present invention allows a supervisor with the administrator password to manually connect to the network appliance 10 and review selected activity information.

Preferably, all instances of the client activity monitor also contain a network activity display module. In some applications, however, it may be desirable to not have all users peer review all other users. For example, a group of senior employees may be selected to have display modules but not more junior employees. Alternatively, a parent may decide to enable older children to monitor activity by younger children but not allow the younger children to monitor the older children. At minimum at least one network activity display module is required for review of network activity. In the event that only one network activity display module is employed, it should be installed on the supervisor's computer or alternatively on a computer in a public or common area so that it is readily viewable by the supervisor and/or other users. A network activity display monitor may be a screen saver similar to screen savers known in the art that display a slide show of images from a folder or other collection of photographs. In the present invention, the screen saver embodiment of the network activity display module operates in a similar fashion in that it displays images in sequence on a video display after a predefined period of inactivity. The images displayed by the screen saver embodiment are obtained from the network appliance and are images depicting activity information that the network appliance has aggregated from all monitored computers.

In alternative embodiments, the network activity display module may be implemented in a wide variety of methods through which images may be presented to a computer user without any affirmative action required by the user. Several such methods well-suited for use with the present invention are as follows. The computer desktop background or wallpaper image may be periodically replaced with a new image from the network appliance. Using this technique, any time a portion of the computer desktop is visible the user will be presented with activity information from the network appliance. Pop-up windows may also be used to periodically present an image to the user. Although pop-up windows have become associated with annoying web advertisements, pop-up windows may be implemented so that they pop up near the edge of the screen and do not take the keyboard focus from the application currently in use. In common use, a pornographic image or a card table is readily recognized even at a reduced size and in the user's peripheral vision. A third method is to use a persistent display module such as a Google Desktop gadget or a Windows Sidebar gadget. A gadget of either type is a mini program that is intended to present information at a glance on a designated location on the computer video display. The above-described display methods are not intended to be limiting but merely illustrative of automatic methods of presenting activity information. By way of further illustration, a digital picture frame or any other display mechanism could be used, including a display connected to a video port on the network appliance. The effectiveness of the present invention is increased by the automatic nature of the display and the use of multiple displays viewable by supervisors and peer users. The user who is frequently reminded that the supervisor and other users may see screen captures of that user's computer activity wilt be significantly deterred from inappropriate computer use.

Although a significant advantage of the present invention is the ability to enforce monitoring by blocking Internet access by computers that do not periodically verify the functionality of the client activity monitor, the utility of this invention is not limited to operation on a single local network. The client activity monitor may also be utilized on notebook computers, handheld computers, and smart phones that are connected to the Internet at remote locations. By way of example, a notebook computer that was used on the local network and had the client activity monitor installed on it could be taken to a coffee shop, hotel, or other remote location and connected to a free wireless internet access point. The client activity monitor on that notebook computer would capture the same activity information and transmit it via the Internet to the network appliance at the local network it was previously connected to. Similarly, activity information for presentation via the network activity display module could also be obtained from the network appliance via the Internet. This is possible because the network appliance has network connections to the local network and the Internet. The network appliance may be identified and located by a computer on a remote network using techniques known in the art such as static IP addresses or dynamic DNS services.

Various modifications, substitutions, and changes may be made in the structure and embodiments shown without departing from the concept of the invention. Therefore, the scope of the invention is to be determined by the terminology of the following claims and the legal equivalents thereof.

What is claimed is:

1. A network management system connected to a client computer via a first network, said client computer having an associated client activity monitor, said network management system comprising:
    (a) a router-switch connected to said first network and to a second network;
    (b) a network server comprising a computer hardware platform having a processor and a computer-readable storage medium in communication with said router-switch;
    (c) a status monitor which receives status messages from each of said client activity monitor; and
    (d) a network activity monitor which receives activity information from said client activity monitor and stores said activity information for subsequent retrieval, said activity information comprising captured screen images from computers connected to said first network;
    (e) a display module operable to display said activity information stored by said network activity monitor on a computer display after a period of user inactivity;
    said network server causing said router-switch to restrict said client computer's access to said second network if the time between receiving of consecutive said status messages by said network server from said client computer exceeds a predetermined amount of time.

2. The network management system of claim 1 further comprising a display module operable to display, without a user of said client computer having to explicitly invoke said display, said activity information received and stored by said network activity monitor.

3. The network management system of claim 1 further comprising a display module operable to display said activity information stored by said network activity monitor on a window that appears on a computer display after a period of user inactivity.

4. The network management system of claim 1 further comprising a display module operable to automatically display said activity information on a screensaver operating on a computer display.

5. The network management system of claim 1 further comprising a display module operable to automatically display said activity information on a sidebar window operating on a computer display.

6. The network management system of claim 1 further comprising a display module operable to automatically display said activity information on a desktop background operating on a computer display.

7. A network management system connected to a client computer via a first network, said client computer including a client activity monitor, said network management system comprising:

(a) a network server comprising a computer hardware platform having a processor and a computer-readable storage medium;
(b) a network activity monitor which receives and stores activity information from said client activity monitor;
(c) a display module operable to display said activity information stored by said network activity monitor on a window that appears on a computer display after a period of user inactivity, said activity information is captured screen images from client computers connected to said first network; and
(d) a status monitor which receives status messages from said client activity monitor, said network server restricting said client computer's access to a second network if the time between receiving of consecutive said status messages by said network server from said client computer exceeds a predetermined amount of time.

8. The network management system of claim 7 wherein said first network is a wireless computer network in a residential environment.

9. The network management system of claim 7 further comprising a display module operable to automatically display said activity information on a sidebar window operating on a computer display.

10. The network management system of claim 7 further comprising a display module operable to automatically display said activity information on a desktop background operating on a computer display.

11. An article of manufacture comprising a non-transitory machine-accessible medium having instructions encoded thereon for enabling a processor to perform the operations of:
(a) capturing client activity information relating to one or more computer terminals, said client activity information is captured screen images from said one or more computer terminals connected to a first network;
(b) storing said client activity information;
(c) retrieving said client activity information;
(d) displaying said client activity information on a screen saver operating on a computer display; and
(e) receiving status messages from said one or more computer terminals and restricting said computer terminal's access to a second network if the time between receiving of consecutive said status messages from said computer terminal exceeds a predetermined amount of time.

12. The article of manufacture of claim 11 further comprising the additional operations of:
(f) determining whether a computer terminal connected to a network is capturing screen images; and
(g) restricting said computer terminal's access to a second network as a function of whether said computer terminal is capturing screen images.

13. The article of manufacture of claim 11 wherein said client activity information further comprises information relating to key presses on a keyboard.

14. The article of manufacture of claim 11 wherein said client activity information further comprises information relating to network traffic to or from a computer terminal.

15. The article of manufacture of claim 11 further comprising the additional operation of displaying said activity information on a sidebar window operating on a computer display.

* * * * *